Patented July 31, 1945

2,380,416

UNITED STATES PATENT OFFICE 2,380,416

PLANT TREATMENT COMPOSITION

John H. Davidson, South Haven, Mich., assignor to The Dow Chemical Company, Midland, Mich., a corporation of Michigan No Drawing. Application August 21, 1942, Serial No. 455,614

5 Claims. (Cl. 167—45)

The present invention is directed to a new composition and a method for its use in killing plant growth, and particularly to a plant treatment composition which on application to the exterior of the plant is at least partially absorbed into the circulatory system thereof. A preferred embodiment of the invention resides in a composition adapted to be employed as a herbicide.

Many organic and inorganic compositions have been suggested for use in retarding or otherwise regulating plant growth. Such interest has been occasioned largely by the need for means of controlling weeds and undesirable tree and shrub growth. A further factor contributing to the demand for plant growth control materials is the lack of adequate means for treating diseased nursery stock and trees suffering from systemic disturbances, or for killing such stock and at the same time destroying insect organisms, their eggs, and larvae present in the soil adjacent to the diseased plant.

Commonly accepted materials for the control of undesirable vegetation are the inorganic chlorates and salts of dinitrophenol. These materials are disadvantageous in use by reason of the highly flammable nature of deposits thereof on dead vegetation. Also, each is objectionable from the point of view of the operator since residues on clothing are so flammable as to constitute a serious hazard. Furthermore, aqueous solutions of the chlorates are very corrosive to metal containers and applicators, whereby specialized equipment is required for their handling.

Similar disadvantages accrue to the conventional use of heavy petroleum oils for the control of vegetation. Here the oily non-volatile residues remaining on the vegetation constitute a fire hazard and those portions of the treating material deposited in and on the soil interfere with its subsequent utilization. Also, it has been found that oil has little effect upon the root systems of noxious weeds, shrubs, and trees whereby a superficial control may be followed by the growth of suckers or the resprouting of the unaffected root systems.

It is among the objects of the present invention to provide an improved herbicide composition at least one component of which will be absorbed by and circulated through the plant to such an extent that both aerial and root portions are affected at points well removed from the point of application. Another object is to provide such a composition, deposits of which will be sufficiently impermanent as not to be objectionable from the point of view of flammability or residual toxicity. A further object is to provide a herbicide composition adapted to be applied to either the aerial or root portions of plants to accomplish the destruction of the same. A still further object is to supply an improved procedure for the killing of plant growth. Other objects will become apparent from the following description.

I have discovered that solutions of gaseous or low-boiling highly volatile organic fumigants in slowly volatile organic liquids are valuable compositions for the killing of plant growth and are sufficiently absorbed in the circulatory system of the plant that, whether applied to the aerial or root portions thereof, an effect is exerted over the entire plant. In a preferred embodiment of the invention amounts and concentrations of materials sufficient to cause a herbicidal effect are employed. Proper and timely application of such herbicidal mixtures results in complete destruction of the treated plant as well as the killing of borers, nematodes, and other organisms present in and on the treated plant or in the soil adjacent thereto. Deposits of my new compositions in or on the plant or soil are so persistent as to exert their effect over a considerable period of time yet are sufficiently volatile that no permanent residue is left to impart undesirable flammability characteristics to the cellulosic plant structure or to poison the soil.

In operating in accordance with the invention, the gaseous or low-boiling volatile organic fumigant is dissolved in the slowly volatile solvent to obtain the desired plant treatment solution. The amount of fumigant employed varies with the particular materials concerned, the maximum solubility of the fumigant in the solvent, and the variety and age of plant to be treated. With a preferred fumigant, methyl bromide, and representative solvent, isopropyl benzene, the amounts of the former employed are from about 3 to about 30 per cent by weight of the ultimate solution. With other fumigants this may vary from about 1 per cent or less to as much as 50 per cent or more by weight of the composition.

The amounts of composition applied to plants vary considerably with the plant and the materials employed in the composition. With methyl bromide solution in isopropyl benzene, from about two fluid ounces to a quart or more of the composition is employed per tree or shrub depending upon the size, age, and general condition of the latter. For the control of grass or weeds, any required amount of the material may be sprayed or poured over the area in which it is desired to obtain the plant growth regulation.

The compositions as described may be applied to plants at any time during the growing season, but have an optimum effect upon the roots when applied in the fall (or near the end of the normal growing season) and upon the leaves, branches, stalks, etc., when applied in the spring. In any event both the roots and aerial portions are affected, but with somewhat selective results occurring during the indicated periods.

While simple solutions may be employed in accordance with the present invention and are preferable, it is to be understood that such solution may be further modified if desired. Thus the basic solution may be emulsified with water and employed in the form of oil-in-water or water-in-oil emulsions. Similarly, sufficient amounts of a resin or plastic material such as polystyrene may be dissolved or dispersed in the basic solution materially to reduce its flow characteristics and form a viscous, film-forming composition. The exact point of application is not critical since by reason of the absorption of a portion of the effective agent into the sap stream, the desired result may be obtained by treatment of either root or aerial portions of the plant. Thus the roots and adjacent soil may be saturated with the effective composition, or the composition may be sprayed or otherwise applied to stalk, trunk, branches, or leaves of the plant. In operation it has been found convenient to apply the composition to the soil immediately adjacent to the stalk or trunk.

The effect exerted by the composition appears to persist over a considerable period of time. Where the composition is employed to destroy shrubs and trees, there is a darkening or browning of the cambium layer accompanied by a withering and shriveling of foliage. This latter result becomes progressively apparent as the composition is circulated through the plant from the point of application to the extremities of the root and aerial systems. Accompanying the foregoing effects is a control of borers, nematodes, and other organisms susceptible to the toxic ingredients of the composition.

The following examples are illustrative but are not to be construed as limiting the invention.

*Example 1*

28 parts by weight of methyl bromide was dissolved in 72 parts of isopropyl benzene to obtain a liquid plant treatment composition. This mixture was applied on the soil in a circle adjacent to the trunks of a number of two year old peach plantings badly infested with peach borer. 63 milliliter portions were employed for each tree. Application was made in the late fall at an air temperature of 52° C. and a soil temperature of 43° C. When the treated trees were examined ten weeks after application, the cambium layer was dead at the crown and throughout the trunk and aerial portion of the trees and the roots had been killed to the extremities of their growing tips. 100 per cent kill of borers occurred both in the tree and the soil adjacent thereto. The composition as disclosed was found to have a vapor pressure of 450 millimeters at 24° C. After exposure to the air for four hours, the mixture showed a loss by evaporation of 22.5 per cent by weight.

*Example 2*

A modified composition consisting of 68.5 per cent by weight of isopropyl benzene, 26.5 per cent of methyl bromide, and 5 per cent of polystyrene was prepared. This composition was appreciably more viscous than that described in Example 1, and upon application on the soil adjacent to the trunks of borer-infested, young peach trees, was not visibly absorbed by the soil but formed a collar about the trunk of each tree. With the initial evaporation of a portion of the more volatile constituents of the composition, a relatively impervious film of polystyrene formed over the surface of the material which greatly reduced the rate of evaporation of the composition into the air. The time of application and soil temperatures were identical with those described in Example 1. Examination ten weeks after application of the material showed that trees treated with 67 milliliter portions of the plant growth regulation material were dead. It was observed that borers in and about the crown of each treated tree were killed as were those in the soil adjacent thereto. The foregoing mixture was found to exert a vapor pressure of 450 millimeters at 24° C. Exposure to the air for four hours at this temperature resulted in a loss of 17 per cent by weight of the composition due to evaporation.

*Example 3*

In a similar manner the compositions described in Examples 1 and 2 were applied in the spring to wild cherry, sassafras, peach, pear, and apple trees ranging in development from year old saplings to mature trees. The amount of material applied varied from two ounces to a quart or more depending upon the age and size of the tree under treatment. With wild cherry, apple, and peach saplings it was found that killing was obtained within a few days evidenced by browning of the cambium layer of roots, crown, trunk and branches, and withering of the leaves. The toxic effect upon the roots was not as rapid or as great as was observed in the fall applications described in Examples 1 and 2. However, by the end of two weeks, roots six inches to two feet from the base of the trunk had been destroyed. The peach trees prior to treatment were badly infested with borers. Examination from time to time following application indicated a substantially complete kill of borer organisms in and about the crown of each tree.

With sassafras, a quick kill of leaves, trunk, and branches resulted.

With five year old peach trees, a gradual kill was obtained extending over a period of several weeks.

With mature pear trees a single application of the composition was found to retard growth and to bring about a semi-dormancy throughout the aerial portion and root systems of the treated trees. A plurality of treatments caused girdling of the trees and eventual destruction as evidenced by the browning of the cambium layer and premature defoliation.

Inspection of the soil adjacent to the trunk and crown of the trees and shrubs in the several applications as described above indicated that traces of the isopropyl benzene were present three weeks after application.

*Example 4*

In a similar fashion compositions were prepared by dissolving 5 and 10 parts by weight of methyl bromide in 95 and 90 parts of isopropyl benzene, respectively. 50 to 100 milliliter portions of these compositions applied at the base of the trunk of each of several five year old peach trees killed by girdling with destruction of the cambium layer at the point of application and a progressive spreading of the effect both upwardly and downwardly therefrom.

Other fumigant materials which, although not entirely equivalent with methyl bromide, may be substituted therefor wholly or in part to obtain related compositions of varying effectiveness include ethylene bromide, ethyl bromide, isopropyl bromide, methyl iodide, tertiarybutyl chloride, chloropicrin, ethylene chloride, carbon tetrachloride, methylene chloride, methyl chloroform, etc. Similarly, isopropyl benzene may be replaced in part or altogether by such slowly volatile organic solvents as ethyl benzene, diethyl benzene, toluene, xylene, monochlorobenzene, monochloronaphthalene, ethylene glycol, low-boiling relatively volatile mineral oil, ortho-dichlorobenzene, propylene dichloride, ethyl naphthalene, dichlorodiethylether, and liquid hydrogenated naphthalene compounds.

Other plastics and resins which may be substituted for polystyrene as employed in certain of the foregoing examples are high viscosity ethyl cellulose, nitrocellulose, cellulose acetate, methylmethacrylate resins, vinylidene chloride polymers and co-polymers, vinyl chloride and vinyl acetate polymers, soluble rubber, etc.

Representative compositions obtained by substitution of certain of the foregoing materials in the preferred composition of the invention are the following:

*Composition A*

| Compound | Parts by weight |
| --- | --- |
| β-β'-dichloro-diethylether | 70 |
| Methyl bromide | 30 |

At 24° C. this composition was found to exert a vapor pressure of approximately 450 millimeters. A portion of this mixture on exposure to air for four hours at 24° C. was found to have undergone evaporation to the extent of 25 per cent by weight.

*Composition B*

| Compound | Parts by weight |
| --- | --- |
| β-β'-dichlorodiethylether | 63 |
| Methyl bromide | 27 |
| Polystyrene | 10 |

At 24° C. this composition exerted a vapor pressure of approximately 430 millimeters. This composition undergoes evaporation to the extent of approximately 19.5 per cent by weight in 4 hours at 24° C.

*Composition C*

| Compound | Parts by weight |
| --- | --- |
| Methyl bromide | 10 |
| Methylene chloride | 8 |
| Isopropylbenzene | 50 |
| Propylene chloride | 32 |

I claim:
1. A herbicide composition including as the active ingredient a solution of methyl bromide in a lower alkyl benzene.
2. A herbicide composition comprising as the active ingredient a solution of methyl bromide in isopropyl benzene.
3. A herbicide composition including as the active ingredient a 3 to 30 per cent by weight solution of methyl bromide in isopropyl benzene.
4. A method for killing plant growth which comprises applying to the plant a composition including as the active ingredient a solution of methyl bromide dissolved in a slowly volatile organic liquid.
5. A method for destroying plant growth which comprises applying to the plant a solution of methyl bromide in isopropyl benzene.

JOHN H. DAVIDSON.